UNITED STATES PATENT OFFICE.

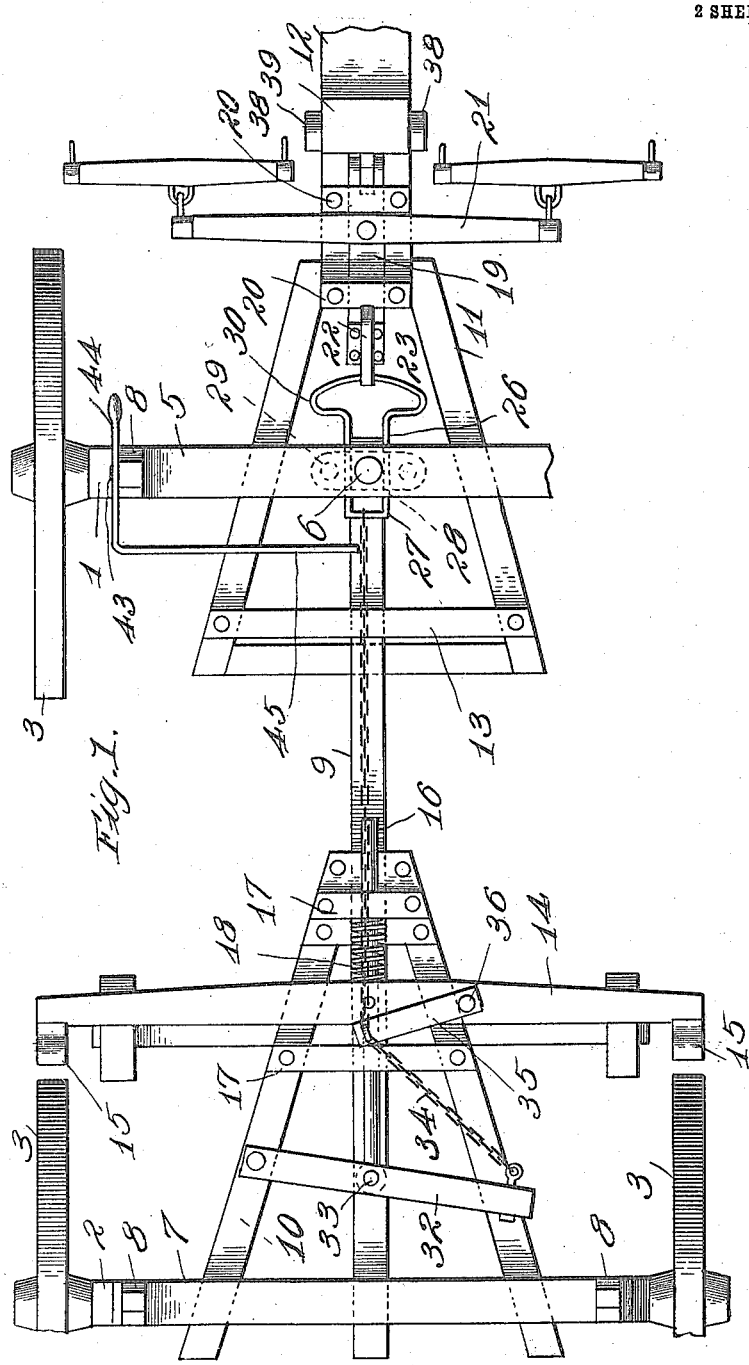

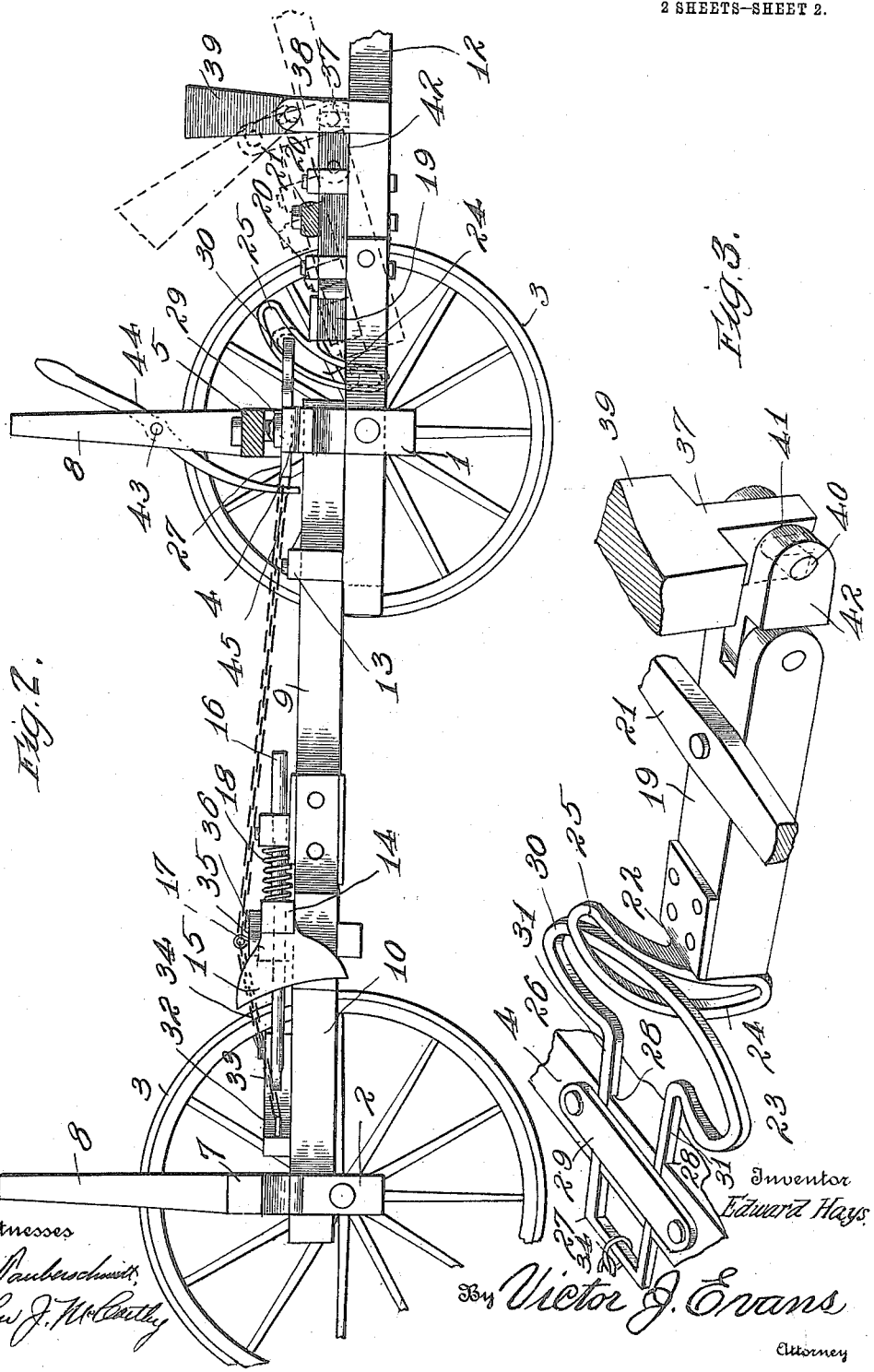

EDWARD HAYS, OF MULDROW, OKLAHOMA.

VEHICLE-BRAKE.

1,135,897.   Specification of Letters Patent.   Patented Apr. 13, 1915.

Application filed March 27, 1912, Serial No. 686,574. Renewed May 2, 1914. Serial No. 835,983.

*To all whom it may concern:*

Be it known that I, EDWARD HAYS, a citizen of the United States of America, residing at Muldrow, in the county of Sequoyah and State of Oklahoma, have invented new and useful Improvements in Vehicle-Brakes, of which the following is a specification.

My present invention relates to improvements in vehicle brakes and has particular application to that class of brakes which operate automatically upon the cessation of the draft upon the vehicle to engage brake shoes with the wheels so as to retard the movement of the vehicle, especially when such vehicle is traveling on a down grade or is at a standstill.

In carrying out this invention, it is my purpose to provide a brake of the above type, wherein the brake shoes may be automatically applied to the wheels of the vehicle to check the movement thereof upon the release of the draft or pulling action due to the draft animals, and wherein the said brake shoes may be disengaged from the wheels automatically in the rear movement of the draft animals to "back" the vehicle or move the same in a relatively reverse direction. Furthermore, I aim to provide a brake of the above stated character which shall embody, among other features, a new and novel form of mechanism for actuating the brakes to engagement with the vehicle wheels, when the pulling of the draft animals has been stopped or checked.

The invention also involves a mechanism operable automatically to release the brake when it is desired to back the vehicle and upon the brake actuating mechanism to relieve the wheels of the influence of such actuating mechanism.

With the above objects in view and others of a similar nature, the invention consists in the construction, combination and arrangement of parts hereinafter set forth in and falling within the scope of the appended claims.

In the accompanying drawings wherein has been illustrated one embodiment of the present invention; Figure 1 is a top plan view of a wagon running gear equipped with the present invention, the brake actuating mechanism being shown in non-braking position. Fig. 2 is a side elevation of the same, and Fig. 3 is a perspective view of a detail of the brake mechanism.

Similar reference characters designate like parts throughout the drawings.

Referring now to the accompanying drawings in detail, the numeral 1 designates the front axle of the vehicle, while the rear axle is denoted by 2, each being provided with the usual ground wheels 3. Rigidly secured to the upper surface of the forward axle 1, is a bearing strip 4 designed to function as a fifth wheel, and secured to this bearing strip 4, is a body bolster 5, the body bolster, bearing strip and forward axle being provided with alining openings through which is passed a king pin 6 designed to permit turning movement of the forward axle with respect to the body bolster, when it is desired to change the path of travel of the vehicle as will be readily understood. Fixed to the upper surface of the rear axle 2 is a body bolster 7 designed to coöperate with the bolster 5 to support the body of the vehicle (not shown), the opposing ends of each bolster being provided with the usual stakes 8. Interconnecting the front and the rear axles, is the usual perch pole or reach rod 9 pivoted directly upon the front axle 1 beneath the bearing strip 4 by means of the king pin 6 and rigidly secured at its rear end to the rear axle 2 and reinforced or braced at its rear portion by means of the usual hounds 10. The front hounds are indicated at 11 and within the forward proximate ends of the latter hounds is pivoted the tongue 12 of the vehicle while the rear bar of the hounds forms a rubbing bearing for the reach rod in the turning movement of the front axle. 13 indicates a cross piece connected to the opposite front hounds adjacent the rear bar thereof, the cross piece serving to securely hold the reach rod in engagement with the rear bar of the hounds and limit the turning movement of the front axle in order to prevent displacement of the parts of the running gear. Although I have shown and described a specific form of vehicle, I desire to have it understood that my improved brake mechanism is not limited to the exact construction of vehicle herein described, as the same may be advantageously applied to vehicles of any construction and design.

Mounted transversely of the running gear of the vehicle, adjacent the rear wheels is a brake beam 14 equipped at its opposite ends with brake shoes 15 adapted to engage the rear wheels to check the movement of the vehicle. This brake beam is designed for sliding movement relatively to the running gear and is provided with a longitudinal rod 16 mounted for sliding movement in bearings 17 secured, in this instance, to the rear hounds 10 and upon the opposite sides of the beam 14. Encircling the rod 16 intermediate the forward bearings 17 and the brake beam is a helical expansion spring 18 designed to exert its tension upon the beam to engage the shoes 15 with the wheels. In order to release the wheels from the influence of the brake beam and operate the latter automatically, when the draft animals exert a pull upon the vehicle, I have provided an actuating mechanism, which includes in this instance, a bar 19 mounted for sliding movement in spaced bearings 20 fixed to the tongue 12 adjacent the pivotal connection of the latter with the front hounds, and to this bar 19 is fastened the doubletree 21 adapted to facilitate the connection of the draft animals with the vehicle. Suitably secured to the rear end of the bar 19 is one member 22 of a coupling 23, which member is provided with a vertically disposed slot 24 communicating with a relatively angular slot 25, the purpose of which will be described hereinafter. The remaining member of the coupling 23 is indicated at 26 and is connected to the forward end of a yoke 27 mounted for sliding movement in grooves 28 formed in the bearing strip 4 and covered by means of a plate 29 bolted or otherwise fastened to the bearing strip between the upper surface of the latter and the lower surface of the front bolster so that wear on the lower surface of the front bolster, incident to the movement of the yoke 27 within the grooves 28, is avoided. The free end of the yoke 27, as illustrated, terminates in a segmental connector 30 fastened to the opposite arms of the yoke by means of integral arms 31. The rear end of the rod 16 projects a suitable distance outwardly of the rear bearing 17 and pivotally connected as at 33, to this projecting end of the rod is a lever 32 fulcrumed at one side of the longitudinal center line of the running gear, the fulcrum of the lever 32, in the present instance, being upon one of the rear hounds 10. The pivotal connection of the rod 16 with the lever 32 is disposed in the plane of the longitudinal center line of the vehicle and is preferably in the form of a pin and slot connection, while the free end of such lever 32 projects to the opposite side of the longitudinal center line of the vehicle, and connected to this free end of the lever is a chain 34 or other suitable flexible member. At an appropriate point in its length, the chain 34 is rigidly secured to one end of a lever 35 which has its opposing end pivoted to the brake beam 14, as at 36, the chain-receiving end of such lever being in a plane approximately coincident with that of the longitudinal center line of the running gear. The free end of the chain 34 is hooked or otherwise fastened to the connector 30, and owing to the formation of such connector, it will be noted that the latter may swing, in the turning movement of the front axle of the running gear, without influencing the chain 34 or the levers 35 and 32.

The operation of the mechanism just described, may be briefly stated as follows: Assuming the draft animals to be attached to the doubletree 21, it will be seen that the latter will be moved forwardly upon the vehicle tongue and carry with it in its forward movement the sliding bar 19. In this movement of the sliding bar, the yoke 27 is slid forwardly within its grooves 28, due to the coupling 23 between the bar 19 and the said yoke. Now, as the yoke is moved, the chain 34 is drawn with it and swings the lever 35 about its pivot point 36, consequently swinging the lever 32 about its fulcrum and sliding the brake beam 14, by means of the rod 16, against the action of the spring 18, whereby the brake shoes will be disengaged from the vehicle wheels. In the event of the vehicle descending a grade, or coming to a standstill, it will be noted that the actuating mechanism will be released, thus permitting the spring 18 to act upon the brake beam to engage the shoes with the wheels and retard, or stop, the movement of the vehicle.

In carrying out my invention, I have provided what may be termed a releasing mechanism which is designed to act upon the brake actuating mechanism to disengage the brake shoes from the vehicle wheels in the "backing" of the vehicle under the action of the draft animals. This mechanism, in the present embodiment of the invention, includes a lever 37 fulcrumed intermediate its ends upon standards 38 rigidly secured to the tongue 12 of the running gear in advance of the bearings 20 of the sliding bar 19 and provided upon its upper end with a weight 39, while its lower end is pivotally connected, by means of a pin and slot connection 40 with the bifurcated end 41 of a link 42 pivoted to the forward end of the sliding bar 19. From this, it will be seen that when the tongue is elevated, owing to the pulling of the draft animals in a rearward direction, the weight 39 will rock the lever 37 about its fulcrum and draw the sliding bar 19 forwardly upon the vehicle tongue, as shown by the dotted lines in Fig. 2, whereby the brake beam will be actuated to relieve the wheels of the influence of the brake shoes, as previously described. Should the weight 39 be insufficient to properly actuate the brake mechanism against the action of the spring 18 in the backing of the draft animals, the action of the weight 39 may be augmented by the operator placing his foot upon the weight 39 and exerting a pressure thereon, thereby insuring the withdrawal of the brake shoes from engagement with the wheels. In the upward movement of the tongue, the coupling member 26 rides out of the slot 24 of the member 22 and into the angular slot 25 thereof so as to accommodate the relative positions of the coupling members in the raising of the tongue and insure the operation of the brake beam.

Journaled in suitable bearings 43 and upon the front bolster 5 and extending to one side thereof, and within convenient reach of an operator, is a hand lever 44 terminating centrally of the vehicle body in an offset portion 45 connected to the yoke 27 so that the wheels may be relieved from the influence of the brake shoes manually and the brake actuating mechanism operated to engage the shoes with the wheels.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

I claim:

1. In a vehicle brake, a mechanism operable automatically to apply the brake upon the cessation of the draft, and means operable to release the brake in the rearward movement of the vehicle under the action of the draft animals, including a weighted lever connected to the first-named mechanism and adapted to operate upon the rising of the tongue in the backing of the vehicle.

2. In a vehicle brake, a mechanism operable automatically to apply the brake upon the cessation of the draft, and means operable automatically to release the brake in the rearward movement of the vehicle under the action of the draft animals, said last-named means including a weighted lever connected to the first mechanism and adapted to operate the same in the raising of the vehicle tongue to relieve the vehicle wheels of the influence of the brake, and a coupling between said mechanism and said means comprising relatively movable members adapted to accommodate the relative positions of the mechanism and means.

3. In a vehicle brake, the combination with the running gear, of a brake beam slidable relatively to said running gear and equipped with brake shoes, a lever fulcrumed at one side of the longitudinal center line of the running gear and extending to the opposite side of such center line, a sliding rod having one extremity pivotally connected to said lever between the ends of the latter, said rod being also connected to said brake beam, a spring encircling said rod and acting to hold said brake beam in braking position, a bar mounted for sliding movement upon the vehicle tongue and adapted to be moved under the action of the draft animal, a second lever pivoted to said brake beam, a connection between said sliding bar and the last-named lever, and a connection between the last-named lever and the first-named lever whereby in the movement of said sliding bar motion will be transmitted to the first-named lever to slide the brake beam against the action of the spring and to non-braking position.

In testimony whereof I affix my signature in presence of two witnesses.

EDWARD HAYS.

Witnesses:
Thos. J. Watts,
Bertha Bozeman.